June 23, 1970     J. H. PITTMAN, JR     3,516,447
CEMENT-LINED PIPE HAVING END INSERTS ASSOCIATED THEREWITH
Filed Nov. 1, 1967     2 Sheets-Sheet 1
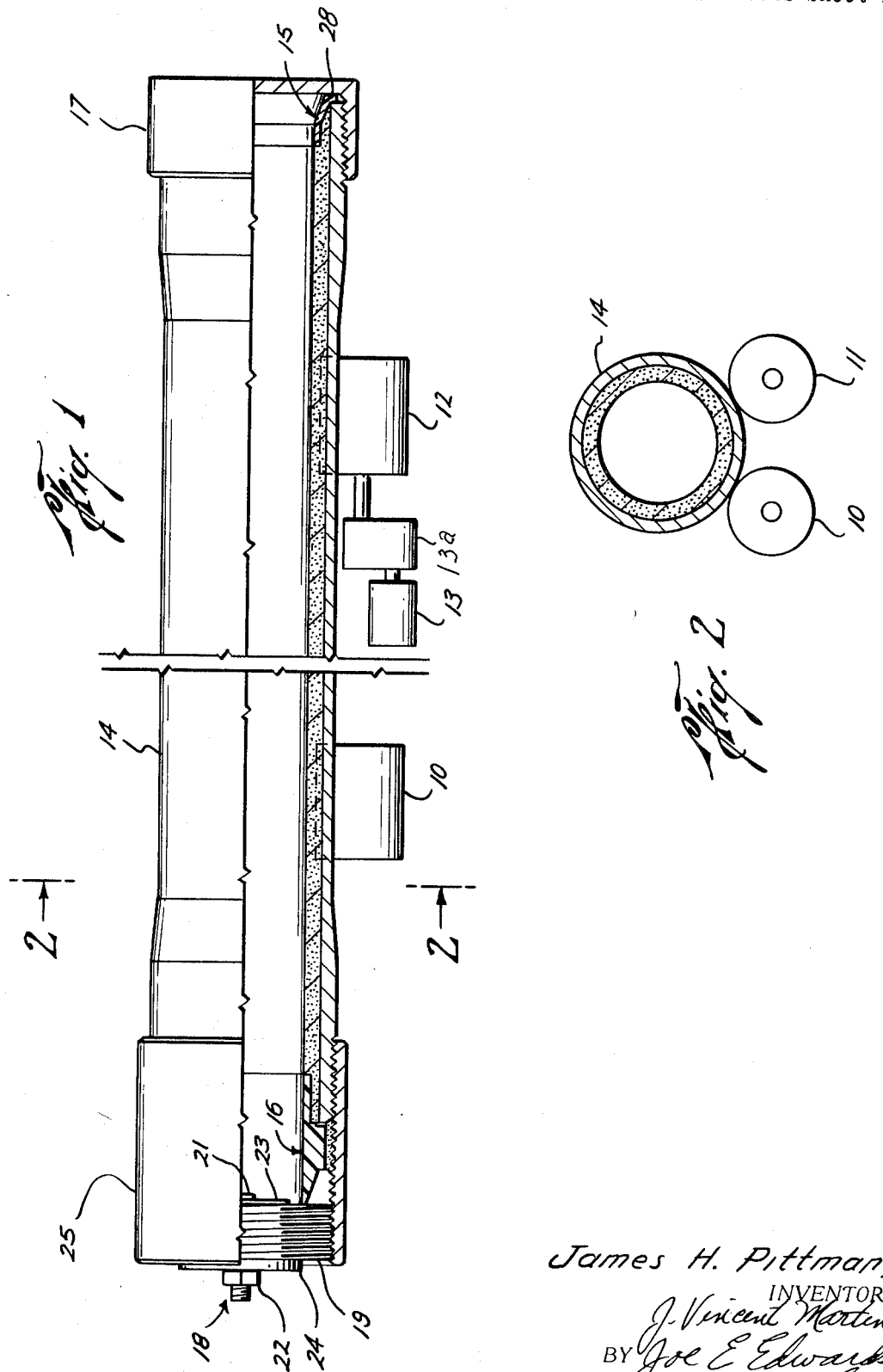
James H. Pittman, Jr.
INVENTOR.
J. Vincent Martin
BY Joe E. Edwards
M. H. Gay
ATTORNEYS

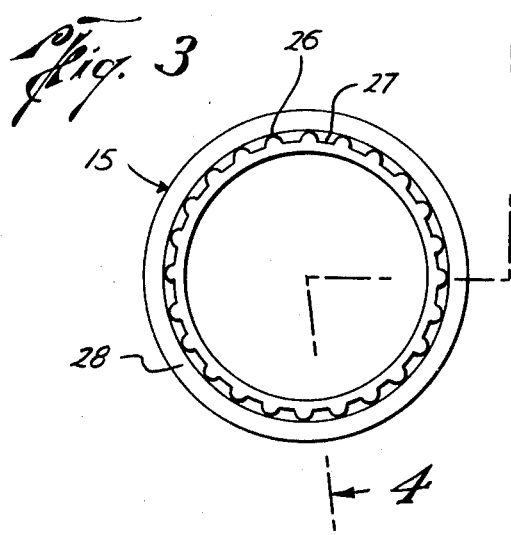
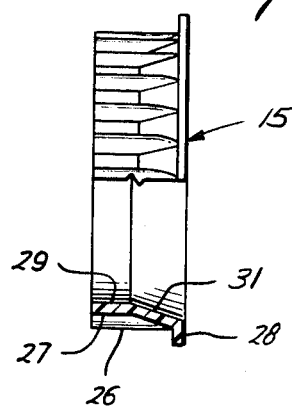
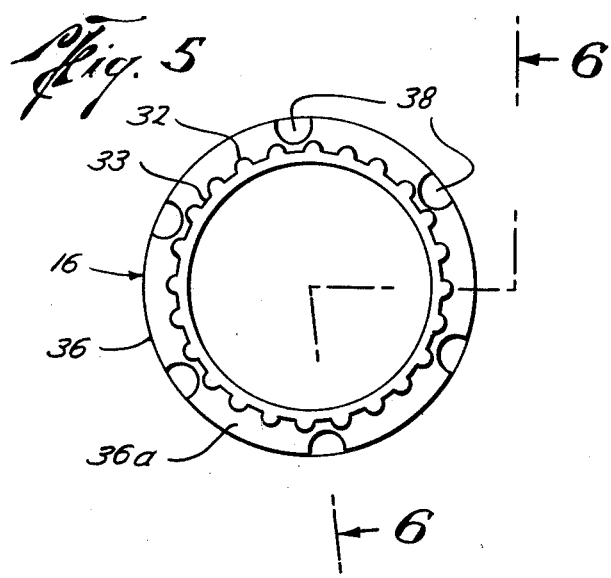
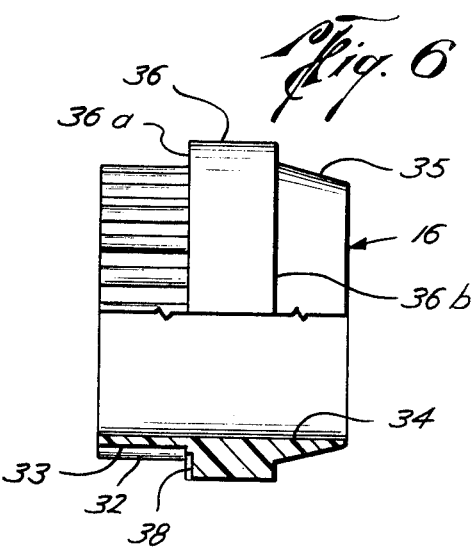
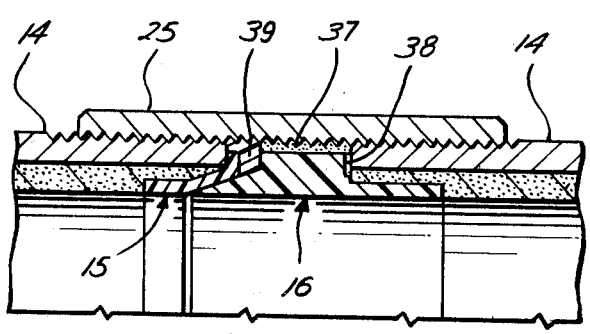

United States Patent Office 3,516,447
Patented June 23, 1970

3,516,447
CEMENT-LINED PIPE HAVING END INSERTS
ASSOCIATED THEREWITH
James H. Pittman, Jr., Midland, Tex., assignor to Permian
Enterprises, Inc., Midland, Tex., a corporation of Texas
Filed Nov. 1, 1967, Ser. No. 679,780
Int. Cl. F16l 9/00, 9/14; B65d 59/00
U.S. Cl. 138—109                                    4 Claims

ABSTRACT OF THE DISCLOSURE

This patent discloses a cement-lined metallic pipe and method of lining the pipe in which plastic inserts are provided at each end of the pipe and engage other inserts in like sections of pipe when they are made up in a string. The inserts plus a suitable seal therebetween insulate the pipe joint from fluids flowing through the pipe, and maintain an alkaline atmosphere between the inserts and the pipe to neutralize any corrosive fluids which may find their way behind the inserts upon cracking of the lining.

---

This invention relates to cement-lined pipe, and more particularly to centrifugally casting the lining with plastic inserts in the end of the pipe and to the resulting product.

Heretofore it has been customary in centrifugally lining pipe with hydraulic cement to plug each end of the pipe and centrifugally cast the cement. When the plugs are removed and the excess water permitted to run out of the pipe, the water erodes away the soft cement lining at the ends of the pipe. This has necessitated hand-patching of the pipe to replace the eroded lining. While hand-patching has been acceptable, the resulting product is not as smooth at the patched sections as in the remainder of the pipe. Hand-patching has increased the labor costs in centrifugally casting pipe. On some occasions hand-patching results in a different wall thickness about the end of a pipe and, if two pipes are made up together with increased wall thicknesses on opposite sides, the effective inner diameter of the pipe is reduced, thus restricting the size of tools which may be run through the pipe.

Cement-lined pipes are customarily joined together with a conventional external threaded collar. Protecting the threaded joint and the exposed section of the collar from the liquids conveyed through the pipe has presented a continuous problem. One of the difficulties experienced results from the usual cement lining extending into and covering one or more threads of the collar which is made up on the pipe. When two sections of pipe are made up together, the collar will sometimes turn on the pipe and crack the cement lining. When this occurs the cement lining falls out of the collar and leaves an area exposed to fluids within the conduit.

It is an object of this invention to provide a cement-lined pipe and method of casting in which the joints between two pipes are protected by insulating the metal pipes and collars from the fluid being conveyed.

Another object is to provide a method of casting and a cement-lined pipe with a collar on one end into which the lining extends wherein an alkaline atmosphere is maintained at the juncture of the pipe and collar, even after the collar has been rotated relative to the pipe and the lining cracked at the collar.

Another object is to provide a method of casting and a cement-lined pipe in which the cement lining is not damaged by excess water being drained from the pipe after casting to eliminate the need for hand-patched ends of cement lining.

Another object is to provide a method of casting and a cement-lined pipe in which the cement lining has a uniform thickness circumferentially about the ends of the pipe to prevent uneven lining thicknesses on opposite sides of adjacent pipe at a joint, reducing the effective diameter available to run tools through the pipe.

Other objects, features and advantages of the invention will be apparent from the drawings, the specification and the claims.

In the drawings, wherein an illustrative embodiment of this invention is shown, and wherein like numerals indicate like parts:

FIG. 1 is a view in quarter-section of a pipe formed in accordance with this invention and supported on the centrifugal casting machine;

FIG. 2 is a view along the line 2—2 of FIG. 1;

FIG. 3 is an end view of one of the inserts shown in FIG. 1;

FIG. 4 is a quarter-sectional view of the insert of FIG. 3 taken along the line 4—4 of FIG. 3;

FIG. 5 is an end view of the other insert shown in FIG. 1;

FIG. 6 is a quarter-sectional view of the insert of FIG. 5 taken along the line 6—6 of FIG. 5; and FIG. 7 is a quarter-sectional fragmentary view of a joint of two of the pipes shown in FIG. 1.

In accordance with the method of this invention, the cement lining in the metallic pipe is cast by the usual centrifugal casting process in which the pipe is rotated at the desired speed to cast the cement in place. Prior to casting, suitable inserts of material inert to the fluids to be conveyed are positioned in the pipe. These inserts are preferably of plastic such as polypropylene or polyethylene which will withstand hydrochloric and other highly acidic streams. The inserts are so formed that during casting the cement lining flows into spaces between the inserts and the pipe. The cement thus acts as an adhesive to lock the inserts in place and provides behind the inserts an alkaline atmosphere so that any leakage of fluid to the area behind the inserts will not result in serious damage to the metal pipe due to the alkaline atmosphere which neutralizes the acids. The insert in the end of the pipe which includes the threaded collar is formed to provide an annular space between the insert and the collar into which the cement flows during the casting operation. During makeup of a string of pipe, this collar may turn a slight amount. If so, cracks will result in the cement lining within the collar. Due to the presence, however, of the inserts, the cracked cement will be maintained in place to provide an alkaline atmosphere which will neutralize any acids which find their way to the cracked cement.

The inserts have a bore with a diameter equal to the diameter of the lined pipe to provide a smooth continuation of the cement lining. It has been found that when the excess water is permitted to run out of the pipe after casting, that the presence of the inserts prevent the water eroding away the cement lining, thus eliminating the need for hand-patching of the ends of the cement lining. In order to obtain this advantage, it is obvious that the inserts will be in place during the casting operation. It is further obvious that to obtain the uniform filing of substantially all voids or spaces between the inserts and the pipe that the inserts must be in place during the casting operation. If the inserts were inserted later by hand, it would be virtually impossible to insure complete filling of the spaces between the inserts and the pipe and the collar. It would further be impossible to insert the inserts by hand without disturbing the cement lining, thus making it necessary to thereafter hand-patch or smooth the lining adjacent the inserts. For these reasons, the inserts are in place prior to centrifugal casting.

Referring now to the drawings, the conventional centrifugal casting machine is indicated schematically by the rollers 10, 11 and 12. Rollers 10 and 11 are at one end of the machine, and roller 12 has a companion roller on the same rotational axis as roller 11. The roller 12 is rotated by the motor 13 through gear reducer 13a. The pipe in which a lining is to be cast is placed upon these rollers and rotated in the conventional manner. Prior to rotation, the pipe 14 in which the lining is to be cast has positioned therein inserts 15 and 16. As noted above, these inserts should be made of a material which is inert to the service in which the pipe is to be used. The present primary use of cement-lined pipe is in the field of water-flooding of oil-bearing formations. It is periodically necessary to acidize the formation face with acid, usually a water solution of hydrochloric acid. For this service the inserts are preferably polypropylene or polyethylene which are inert to hydrochloric acid.

The desired amount of hydraulic cement is weighed and placed in the pipe. The hydraulic cement may be of any desired composition, such as portland cement and sand, portland cement and pozzolana, etc. The inserts are placed in the pipe either before or after the cement is introduced. Preferably the inserts are in place before the cement is placed in the pipe. The two ends of the pipe are provided with suitable plugs. The pin end of the pipe may be closed with a conventional pipe cap 17. Preferably the collar end of the pipe is closed by a plug indicated generally at 18. This plug is a plurality of discs of rubber or synthetic rubber material 19 held together by a bolt 21 extending axially through the center of the disc and a nut 22. Metal washers 23 and 24 are provided on opposite sides of the resilient disc 19 and, upon tightening of nut 22, the several discs expand radially into engagement with the collar 25 on pipe 14. While it is preferred that the plug 18 be in contact with the end of the insert 16, this is not necessary, as any excess cement which may find its way into the free end of the collar may be wiped out after the lining has been cast.

The insert for the pin end of the pipe is shown in FIGS. 3 and 4. The insert has an annular outer surface formed of alternate lands 26 and grooves 27. These lands and grooves extend substantially the axial length of the insert. At one end of the insert there is provided an outturned flange 28 which is adapted to engage the end of the pipe 14. This flange preferably begins at the end of the lands 26.

A cylindrical bore 29 is provided through a portion of the insert. This bore has a diameter substantially equal to the inner diameter of the cement-lined pipe to provide a continuation of the cement lining. To provide a surface for engagement with another insert in another section of pipe, a frustoconical surface 31 extends from the bore 29 through the remainder of the insert. The particular construction of the insert is not critical. It is necessary that some centering means be provided so that the insert will center in the pipe and spaces should be provided between the insert and pipe into which cement may flow to lock the insert in place and provide the alkaline atmosphere behind the insert. It will be appreciated that the semicircular lands are best adapted for this purpose, as they give a line contact with the pipe and cement can be present over a very substantial area of the pipe. Thus by "lands" as used herein is meant three or more protrusions on the insert which contact the wall of the pipe and center the insert in the pipe, and by "grooves" as used herein is meant the space between the three or more lands.

The flange 28 serves to position the insert in place and avoids having to carefully align the insert with the end of the pipe by eye. Preferably the cap 17 has a thread system which permits it to engage the flange 28 and hold the flange firmly against the end of the pipe during centrifugal casting.

Referring now to FIGS. 5 and 6, the other insert is shown. Again a series of lands 32 and grooves 33 are provided to center the insert in the pipe while permitting cement to flow into the grooves. The bore 34 through the insert is cylindrical in form and of a constant diameter equal to the inner diameter of the cement lining to form a continuation thereof.

In order to provide an engaging surface for engaging the surface 31 of the insert of FIGS. 3 and 4, the other end of insert 16 is provided with a frustoconical exterior surface 35. Preferably the angle of surface 35 relative to the axis through the insert is less than the angle of surface 31 of the insert of FIG. 4. This results in a line contact between the two surfaces which gives a better opportunity of sealing.

An intermediate section of the insert, that is, between the land and groove section and the frustoconical section, is provided with a radially outwardly extending flange 36. The flange 36 has an outer diameter which is preferably slightly less than the inner diameter of the collar 25. This permits cement to find its way into the space between the land 36 and the collar 25 as indicated at 37 in FIG. 7. The shoulder 36a provides a stop for engaging the end of the pipe 14 and positions the insert in place. The other shoulder 36b provides a surface which cooperates with the confronting surface of flange 28 of the other insert to confine therebetween a plastic material inert to the fluid being transferred through the conduit to assist in sealing between the two inserts. Preferably a neoprene rubber paste is pumped into the joint to seal against hydrochloric acid service.

To insure that cement will find its way into the space between the collar 25 and the flange 36, small grooves 38 may be provided in the surface 36a connecting with the grooves 33.

In practicing the method of the invention, the inserts 15 and 16 are preferably positioned in place and one of the plugs or caps 17 and 18 placed to seal the end of the pipe. The hydraulic cement is then weighed and dumped into the pipe. The other plug or cap is placed on the pipe and the pipe placed on the centrifugal casting machine and rotated at the desired speed to centrifugally cast the lining. During casting the cement will substantially completely fill the lands 27 and 33 and will fill the space between flange 36 on insert 16 and the collar 25. As the collar is threaded, it is of course possible to have the flange 37 in contact with the collar and permit the cement to flow through the thread system. It is prefered to have a space at this point to insure that the hydraulic cement will substantially coat the collar. After the cement is cast, the end plugs are removed and excess water runs out of the pipe. Due to the presence of the inserts the water does not tend to erode away the cement at the ends of the limings. Without the inserts the water erodes channels through the end sections of the lining. The inserts being the same diameter as the lining prevent channeling and thus the erosion problem is conquered.

The pipes are then permitted to cure in the conventional manner.

When two pipes are to be made up together, a ring of paste material, such as the neoprene rubber 39, is placed between the collar 25 and the frustoconical portion 35 of insert 16. The pin end of another pipe having the insert 15 therein is then made up in the collar and the seal material 39 is compressed between the flange 28 and the surface 36b. The insert 16 is preferably of a slightly resilient material so that it will give as the thread system is made up and provide the line contact seal referred to above. Of course, any excess sealing paste 39 will be forced out past the two confronting frustoconical surfaces 31 and 35.

It should be noted that if during makeup the collar 25 turns on pipe 14 that the concrete lining will crack. Due to the presence of the inserts, however, this concrete material, even though cracked, will be retained in position, and if any acid finds its way behind the inserts the alkaline atmosphere provided by the concrete will result in neutralization of the acid. This is of course true of any acid which may find its way behind the inserts at any position as the construction is such that cement is present between each insert and the pipe and collar, and thus any seepage of acid behind the inserts will result in neutralization of the acids by the concrete behind the inserts.

From the above it will be seen that all of the objects of this invention have been accomplished. While preferred forms of inserts are shown, it is apparent that their particular configuration is not critical. So long as they are centered in the pipe, they will perform their desired function. While it is preferred to have engaging surfaces, it is apparent that the frustoconical pin 35 could be omitted and any desired seal member provided between the two inserts. The engaging surfaces are preferred, however, as they hold the sealing material 39 in place while permitting different degrees of makeup of the thread system. Any excess material 39 which may escape between the frustoconical surfaces will be washed away by the fluid passing through the pipe.

What is claimed is:

1. A flow conduit comprising,
   a metallic pipe,
   an annular insert in each end of the pipe,
   each said insert having an annular outer surface formed of alternate lands and grooves extending generally longitudinally of the insert and an annular bore therethrough,
   said lands engaging the pipe to center the inserts therein,
   and a hydraulic cement lining in said pipe having an inner diameter substantially equal to the smallest diameter section of said bore,
   said lining extending into and substantially filling said grooves of each insert,
   said cement lining having been centrifugally cast with said inserts in place.

2. A flow conduit comprising,
   a metallic pipe,
   an annular plastic insert in each end of the pipe adapted to engage another plastic insert upon two lengths of flow conduit being joined together,
   each said insert having an annular outer surface formed of alternate lands and grooves extending generally longitudinally of the insert and an annular bore therethrough,
   said lands engaging the pipe to center the inserts therein,
   and a hydraulic cement lining in said pipe having an inner diameter substantially equal to the smallest diameter section of said bore,
   said lining extending into and substantially filling said grooves of each plastic insert,
   said cement lining having been centrifugally cast with said plastic inserts in place.

3. The conduit of claim 2 wherein the engaging surfaces of said inserts are frusto-conical in form and each insert has a radially outwardly extending flange at the large diameter end of the frusto-conical surface adapted to confine an acid-resistant material therebetween.

4. The conduit of claim 2 wherein a collar is threaded onto one end of the pipe,
   said insert in said one end of the pipe having said lands and grooves on one end thereof and a frustoconical external surface on the other end thereof providing for engagement with another insert, and a radially outwardly extending annular flange providing the intermediate section of said insert,
   said flange being slightly smaller in diameter than the inner diameter of said collar whereby during casting cement will flow into the space between said flange and said collar.

References Cited

UNITED STATES PATENTS

| | | | |
|---|---|---|---|
| 2,872,947 | 2/1959 | Isenberg | 138—109 |
| 3,087,515 | 4/1963 | Venable et al. | 138—175 X |
| 3,125,124 | 3/1964 | Daniels, et al. | 138—141 |
| 3,177,902 | 4/1965 | Rubenstein | 138—145 X |
| 3,249,665 | 5/1966 | Bearden et al. | 138—175 X |
| 3,340,115 | 9/1967 | Rubenstein | 138—176 X |
| 3,425,455 | 2/1969 | Kilpert et al. | 138—149 X |

FOREIGN PATENTS

| | | |
|---|---|---|
| 948,439 | 2/1964 | Great Britain. |

LAVERNE D. GEIGER, Primary Examiner

U.S. Cl. X.R.

138—96, 140, 175